United States Patent
Howley

(10) Patent No.: US 7,421,800 B2
(45) Date of Patent: Sep. 9, 2008

(54) SCALE READING APPARATUS

(75) Inventor: Colin Keith Howley, Stonehouse (GB)

(73) Assignee: Renishaw PLC, Gloucestershire (GB)

( * ) Notice: Subject to any disclaimer, the term of this patent is extended or adjusted under 35 U.S.C. 154(b) by 6 days.

(21) Appl. No.: 11/629,466

(22) PCT Filed: Jun. 21, 2005

(86) PCT No.: PCT/GB2005/002442

§ 371 (c)(1), (2), (4) Date: Dec. 14, 2006

(87) PCT Pub. No.: WO2005/124288

PCT Pub. Date: Dec. 29, 2005

(65) Prior Publication Data

US 2007/0227438 A1    Oct. 4, 2007

(30) Foreign Application Priority Data

Jun. 21, 2004    (GB) ................................. 0413711.3

(51) Int. Cl.
*G01B 11/02*    (2006.01)
*G01B 7/02*    (2006.01)

(52) U.S. Cl. ........................................ 33/706; 33/1 PT

(58) Field of Classification Search ................. 33/706, 33/1 PT, 1 N, 707, 708

See application file for complete search history.

(56) References Cited

U.S. PATENT DOCUMENTS

| | | | | | |
|---|---|---|---|---|---|
| 4,363,964 | A | * | 12/1982 | Schmitt | 33/707 |
| 4,477,189 | A | * | 10/1984 | Ernst | 33/707 |
| 4,519,140 | A | * | 5/1985 | Schmitt | 33/706 |
| 4,628,609 | A | | 12/1986 | Rieder et al. | |
| 4,631,404 | A | * | 12/1986 | Burkhardt et al. | 33/707 |
| 4,654,527 | A | * | 3/1987 | Schmitt | 33/707 |
| 4,701,615 | A | * | 10/1987 | Schmitt | 33/706 |
| 4,996,778 | A | * | 3/1991 | Rieder et al. | 33/707 |
| 5,010,655 | A | * | 4/1991 | Rieder et al. | 33/706 |
| 5,651,187 | A | * | 7/1997 | Affa | 33/706 |
| 5,793,201 | A | | 8/1998 | Nelle et al. | |
| 2003/0145479 | A1 | | 8/2003 | Mayer et al. | |
| 2004/0245442 | A1 | | 12/2004 | Gruber et al. | |

FOREIGN PATENT DOCUMENTS

| | | |
|---|---|---|
| DE | 42 00 616 A1 | 7/1993 |
| WO | WO 03/006926 A1 | 1/2003 |

* cited by examiner

*Primary Examiner*—Christopher W Fulton
(74) *Attorney, Agent, or Firm*—Oliff & Berridge

(57) ABSTRACT

A scale for a scale reading apparatus has a scale track with scale marks which form an incremental scale. The scale also has a set of reference marks. The scale has at least one additional track and different combinations of markers in the at least one additional track have different functions, for example reference mark enablers and right and left limit switches.

14 Claims, 1 Drawing Sheet

SCALE READING APPARATUS

The present invention relates to scale reading apparatus. In particular the invention relates to scale reading apparatus having limit switches and reference marks.

A known form of scale reading apparatus for measuring relative displacement of two members comprises a scale on one of the members having scale marks defining a pattern and a readhead provided on the other member. An optical scale reading apparatus has means for illuminating the scale, a detecting means in the readhead responsive to resultant light patterns to produce a measure of relative displacement of the scale and readhead. A scale having its marks in a periodic pattern is known as an incremental scale and provides an output of up and down counts. A scale may be provided with reference marks which when detected by the readhead enable the exact position of the readhead to be determined.

Mass produced scale may have an incremental track and a plurality of reference marks. The user may wish to use some of these reference marks but not others.

In many machines, for example machine tools, the end points of movement of the machine part are defined by limit switches. These for example may be mechanical, magnetic or optical.

The present invention provides a scale for a scale reading apparatus comprising:
a track having scale markings;
markers of two or more different states;
wherein different combinations of the two or more different states of markers provide different functions.

The markers have different states if they can be differentiated, i.e. they may be different types of markers or may be the same type of marker on different tracks.

The track may comprise an incremental track. The incremental track may include at least one reference mark. Alternatively reference marks may be provided in an additional track parallel to the track.

Markers of two states may be combined to produce four output states, i.e. no markers of either state, a single marker of a first state, a single marker of a second type, and markers of both first and second state.

The functions of the different marker combinations may for example comprise a reference mark enabler and limit switches.

Markers of a first state may be provided on a first additional track and markers of a second state may be provided on a second additional track. The first and second markers may be otherwise identical.

Alternatively two different states of markers may be provided on a single track.

In a preferred embodiment, a marker of a first state acts as a first limit switch, a marker of a second state acts as a reference mark enabler and markers of both first and second states act as a second limit switch.

At the position with markers of both first and second states, the marker of the second state may extend further than the marker for the first state on at least one side. This has the advantage that if the readhead is yawed, it will never detect the marker of the first state before the marker of the second state. Thus the function of the double marker (in this case the second limit switch) cannot be mistaken for the function of the marker of a first state (in this case the first limit switch).

At the position with markers of both first and second states, the marker of the second state may extend further than the marker of the first state on at least one side by a distance less than x, and at the position of a marker only of the second state, the marker may have a length of greater than x. This has the advantage that if a marker of the second state is detected, it can be confirmed whether there is also a marker of the first state by moving the readhead a distance x. The position of the markers may be adjustable and are suitable for adjustment by an end user. For example the markers may comprise stickers, magnets or releasably mounted in fixing holes.

The invention will now be described with reference to the accompanying drawings in which.

Figure 1:
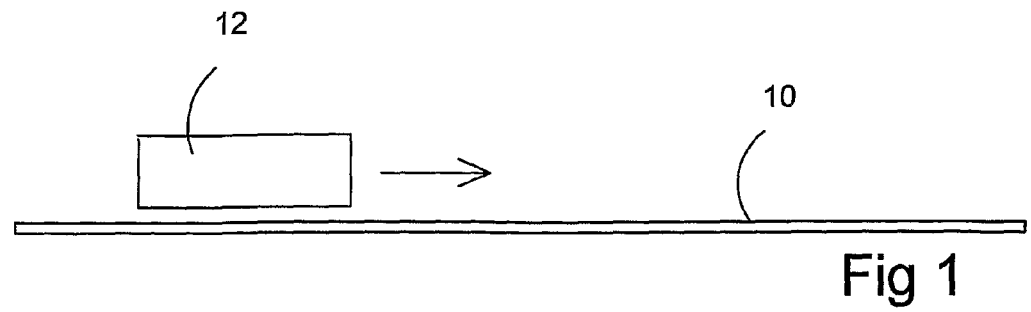
FIG. 1 is a side view of a scale and readhead.
Figure 2:
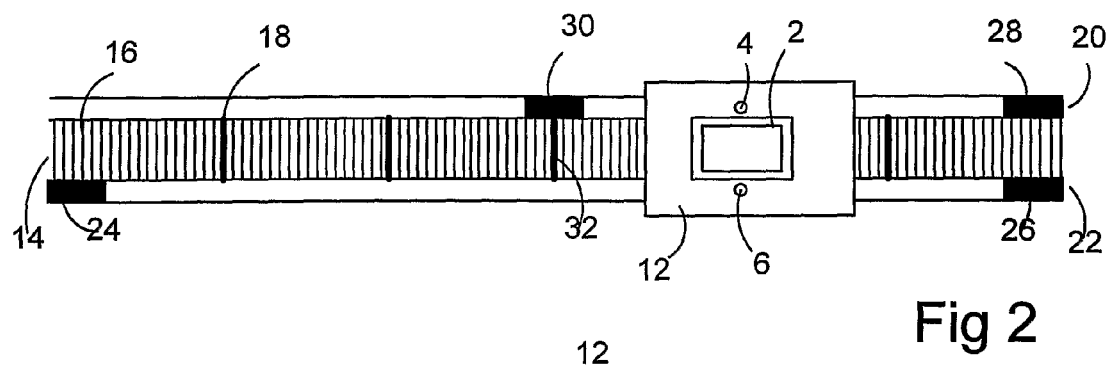
FIG. 2 is a plan view of a first embodiment of the scale.

FIG. 1 illustrates a scale 10 mounted on a first machine part (not shown) and a readhead 12 mounted on a second machine part (not shown). The second machine part and thus the readhead being movable relative to the scale. FIG. 2 illustrates the scale 10 which has an incremental track 14 comprising a periodic pattern of scale marks 16 made up of alternate reflecting and non-reflecting lines. Reference marks 18 are embedded in the incremental scale. These may be embedded by removing or adding scale marks for example. Alternatively reference marks may be provided in a separate scale track. When there are several reference marks, the end user may wish to select a particular reference mark and ignore the other reference marks.

It is also desirable to mark the limit of the scale, so that the moving part of the machine does not move beyond these limits.

As shown in FIG. 2 two additional tracks 20,22 are provided on either side of the incremental track 14. Markers in these two tracks may be used for limit switches and to enable reference marks. Thus in FIG. 2 a single marker 24 in track 22 indicates the left limit switch, a single marker 30 in track 20 is a reference mark enabler and markers 26 in track 22 and 28 in track 20 act as a right limit switch. Thus by using two tracks, the combination of a single marker in track 20, a single marker in track 22, or markers in both the tracks 20 and 22 can be used to indicate three different functions, i.e. the left and right limit switches and an enabled reference mark.

The readhead 12 is provided with standard incremental optics 2 for reading the incremental scale, reference mark sensing optics (not shown) for reading the reference mark and two reflective optical sensors 4,6 for detecting the markers in tracks 20,22.

The reflective optical sensors 4,6 may be offset from the incremental optics 2 in the longitudinal direction. In this case the reference mark enabler 30 may be correspondingly offset from the reference mark 32.

Figure 3:
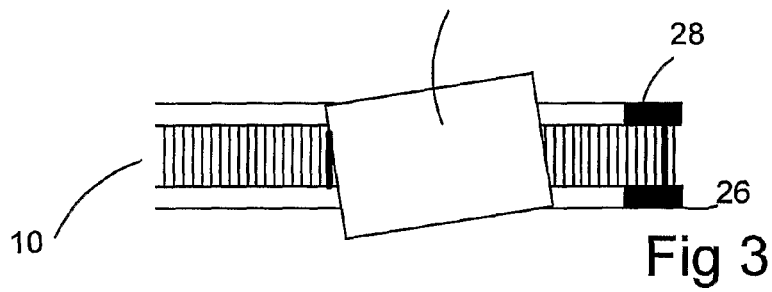
FIG. 3 is a plan view of part of the scale of FIG. 2 and a yawed readhead.

However if the readhead 12 is yawed, as shown in FIG. 3, or if the markers are not accurately positioned, it is possible that when the readhead passes over the right limit switch it would detect one of marks 28 and 26 before the other and thus mistake the right limit switch for either a reference mark enabler (if mark 28 in track 20 is detected first) or the left limit switch (if mark 26 in track 22 is detected first). In particular if the right light switch is mistaken for the left limit switch no signal will be sent to the moving machine part to stop movement and the moving machine part will move too far.

Figure 4:
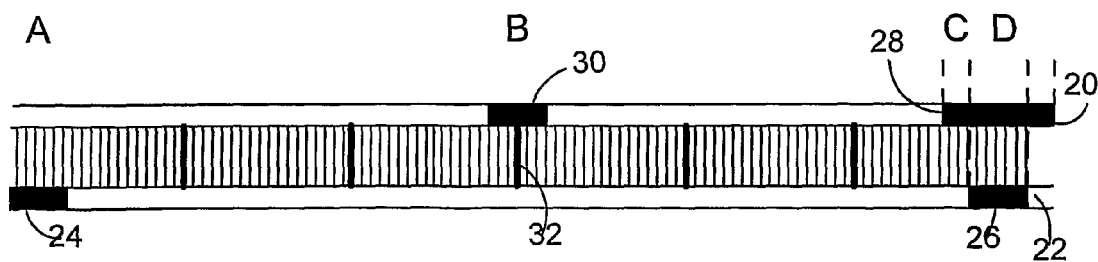
FIG. 4 is a plan view of a second embodiment of the scale.

In order to overcome this problem, the layout of the double marker representing the right limit switch is altered. As shown in FIG. 4, mark 28 in track 20 is extended past mark 26 in track 22 in both directions, ensuring that mark 28 is always read before mark 26.

Thus in this arrangement the right limit switch cannot be mistaken for the left limit switch as the arrangement does not allow for the mark 26 in track 22 to be detected without a mark in track 20.

In order to avoid confusion between the right limit switch and the reference mark indicator, a rule is given to the readhead that it must travel a distance x (for example 2 mm) before it switches on the reference mark sensor. The marker 30 acting as a reference mark enabler must extend at least distance x either side of reference mark 32. The overhang of marker 28 over marker 26 must be less than distance x.

Thus when the readhead is moving over the right limit switch, after detecting marker 28 in track 22 it will detect marker 26 in track 22 within distance x and thus detect the right limit switch. When the readhead is positioned over the reference mark enabler marker 30, it will travel distance x in either direction and not pick up any mark in track 22 thus detecting a reference mark enabler. Thus with this arrangement of markers in tracks 20 and 22, the combination of markers can be differentiated from each other when the readhead is turned on.

If the readhead powers on at position A, the marker 24 is identified as the left light switch as this is the only scenario when there is a mark only in track 22.

If the readhead powers on a position B, there could be a potential confusion with position C, but by moving the readhead x distance, no mark in track 22 is detected and thus position B is confirmed.

If the readhead powers on a position C, there could be confusion with position B, but by moving the readhead a distance x, mark 26 in track 22 will be detected and position C is confirmed.

If the readhead powers on a position D, both the markers 26,28 are detected and thus there is no confusion.

However if there is no reference mark near zone C, the scheme illustrated in FIG. 4 will work without the requirement for moving the readhead a distance x.

FIGS. 1-4 illustrate a reflective system. The invention is also suitable for a transmissive system.

The position of the markers on tracks 20 and 22 are preferably detected by photodetectors in the readhead. For example the markers could be dark on a reflective background.

The markers could comprise a device such as a chamfered surface, prism or diffraction grating which directs light in a different direction to the rest of the surface.

Preferably the markers are adjustable, for example they may comprise stickers, slides or be attachable magnetically. Alternatively the markers could be non-optical for example magnetic and could be detected by sensors (e.g. Hall sensors) in the readhead.

This invention is suitable with different types of scale, for example capacitance, inductive, magnetic and optical incremental scales.

Although the described embodiments show tracks 20 and 22 on either side of the incremental track, they could be positioned side-by-side.

Alternatively, the markers may be placed in a single track. For example, markers for different colours may be used, for example a blue marker for the left limit switch, a red marker for a reference mark enabler and both blue and red markers for the right limit switch. The readhead would thus have detectors that are sensitive to the different colour markings.

Although the above description describes a linear scale, this invention is also suitable for a partial arc on a rotary scale. The invention is also suitable for a mid travel limit and for multiple limits allowing the use of multiple readheads on a single axis system.

The invention claimed is:

1. A scale for a scale reading apparatus comprising:
   a track having scale markings;
   markers of two or more different states;
   wherein a marker of a first state has a first function, a marker of a second state has a second function and markers of both first and second states have a third function and wherein at the position with markers of both first and second states, the marker of the second state extends further than the marker of the first state on at least one side.

2. A scale according to claim 1 wherein the track comprises an incremental track.

3. A scale according to claim 2 wherein the incremental track includes at least one reference mark.

4. A scale according to claim 2 wherein at least one reference mark is provided in an additional track parallel to the incremental track.

5. A scale according to claim 1 wherein two states of markers are combined to produce four output states.

6. A scale according to claim 5 wherein the functions of the different marker combinations comprise a reference mark enabler and at least one limit switch.

7. A scale according to claim 1 wherein markers of a first state are provided on a first additional track and markers of a second state are provided on a second additional track.

8. A scale according to claim 7 wherein the first and second markers are otherwise identical.

9. A scale according to claim 1 wherein markers having different states are provided on a single track.

10. A scale according to claim 1 wherein at the position with markers of both first and second states, the marker of the second state extends further than the marker of the first state on at least one side by a distance less than x, and at the position of a marker only of the second state, the marker has a length of greater than x.

11. A scale according to claim 1 wherein the first function is a first limit switch, the second function is a reference mark enabler and the third function is a second limit switch.

12. A scale according to claim 1 wherein no marker of either state has a fourth function.

13. A scale according to claim 12 wherein the fourth function is no reference mark enabler or limit switch.

14. A scale according to claim 1 wherein the position of the markers is adjustable.

* * * * *